United States Patent
Fischer

(10) Patent No.: US 7,555,572 B2
(45) Date of Patent: Jun. 30, 2009

(54) PLUG-IN MODULE FRAME AND MODULE THEREFORE

(75) Inventor: Jurgen Fischer, Backnang (DE)

(73) Assignee: Telent GmbH, Backnang (DE)

( * ) Notice: Subject to any disclaimer, the term of this patent is extended or adjusted under 35 U.S.C. 154(b) by 56 days.

(21) Appl. No.: 10/596,204

(22) PCT Filed: Oct. 4, 2004

(86) PCT No.: PCT/EP2004/052425

§ 371 (c)(1),
(2), (4) Date: Apr. 16, 2007

(87) PCT Pub. No.: WO2005/055550

PCT Pub. Date: Jun. 16, 2005

(65) Prior Publication Data

US 2008/0039060 A1    Feb. 14, 2008

(30) Foreign Application Priority Data

Dec. 2, 2003    (DE) .............................. 103 57 269

(51) Int. Cl.
*G06F 3/00*    (2006.01)
(52) U.S. Cl. ................. 710/11; 710/8; 710/10
(58) Field of Classification Search .............. 710/8, 710/10, 11
See application file for complete search history.

(56) References Cited

U.S. PATENT DOCUMENTS

| | | | |
|---|---|---|---|
| 5,490,252 A | 2/1996 | Macera et al. | |
| 5,870,626 A | 2/1999 | Lebeau | |
| 6,692,159 B2 * | 2/2004 | Chiu et al. | 385/53 |
| 7,070,446 B2 * | 7/2006 | Henry et al. | 439/541.5 |
| 7,317,733 B1 * | 1/2008 | Olsson et al. | 370/466 |
| 2002/0116564 A1 | 8/2002 | Paul et al. | |

(Continued)

FOREIGN PATENT DOCUMENTS

WO    00/77551 A1    12/2000

OTHER PUBLICATIONS

Small Form-factor Pluggable (SFP) Transceiver MultiSource Agreement / SFP transceiver specificiation, Sep. 14, 2000, pp. 5-38.*

*Primary Examiner*—Niketa I Patel
*Assistant Examiner*—David E Martinez
(74) *Attorney, Agent, or Firm*—Coats & Bennett, P.L.L.C.

(57) ABSTRACT

A plug-in module frame has sockets (2) with at least one signal contact (7, 16) each for passing an information signal between the plug-in module frame (1) and a plug-in module (3) mounted at one of the sockets (2). A protocol converter (9, 10, 11, 12, 14, 15, 17) having first and second terminals communicates with the plug-in module (3) via its first terminal and signal contact (7, 16) ac-cording to a first protocol and via its second terminal according to a second protocol. Type detecting means (8) are provided for detecting a characteristic of a plug-in module (3) mounted in socket (2), which characteristic is unambiguously associated to a protocol supported by the plug-in module (3), and the protocol converter (9, 10, 11, 12, 14, 15, 17) which is connected to the type detecting means and supports a plurality of first protocols is adapted to use at its first terminal a protocol encoded by the detected property of the plug-in module (3) at its first terminal.

8 Claims, 2 Drawing Sheets

U.S. PATENT DOCUMENTS

| | | |
|---|---|---|
| 2002/0169914 A1 | 11/2002 | Shteyn |
| 2002/0181895 A1 | 12/2002 | Gilliland et al. |
| 2003/0061393 A1 | 3/2003 | Steegmans et al. |
| 2005/0063647 A1* | 3/2005 | Thornton et al. .............. 385/89 |

* cited by examiner

PLUG-IN MODULE FRAME AND MODULE THEREFORE

The present invention relates to a plug-in module frame and a corresponding plug-in module, particularly for application in a telecommunication system.

For data transfer between the nodes of a network, a wide variety of protocols have been devised which differ in many characteristics. In order to be able to process data transferred according to such different protocols in a common fashion at the physical layer of a network node (e.g. layer 1 of the OSI model), the SFP agreement (Small Form factor Pluggable (SFP) Transceiver Multi-Source Agreement (MSA)) was established in the year 2000 between a large number telecommunication infra-structure manufacturers, which defines mechanical characteristics of a plug-in module and of a socket for receiving the module as well as electrical characteristics of communication signals which are exchanged between plug-in module and socket. While the sockets may be regarded as part of a node, the plug-in modules each form a terminal of a transmission line which extends from one node to an adjacent node.

In order to convert communication signals transmitted on the transmission line according to an arbitrary protocol into the format which is transferred at the signal contacts between plug-in module and plug-in module frame, protocol-specific converter units are required. These cannot always be straight-forwardly fitted into the limited space of a SFP plug-in module casing. Further, for each type of protocol which is used on a transmission line, an adapted converter unit is required; i.e. the variety of types of SFP plug-in modules is as large as the number of protocols that may be used on the transmission lines. Many of these types are manufactured in small series only and are accordingly expensive.

It would be conceivable to provide no converter unit at all in the plug-in module and to pass the communication signals to the socket in the format in which they were received via the transmission line, but this would require the socket to be specifically adapted to the protocol of the transmission line and would thus decrease the flexibility of the SFP-MSA solution.

The object of the present invention is to remedy these disadvantages by providing a plug-in module frame and a plug-in module adapted to be inserted into said frame, which allow to use a same type of plug-in module for various protocols used on the transmission lines while still allowing to mount the plug-in modules at arbitrary sockets that are not specific for the protocol used on the transmission line, and to exchange data between the plug-in module and the plug-in module frame.

This object is achieved by a plug-in module frame having at least one socket where at least one signal contact for passing a communication signal between in module frame and a plug-in module mounted at the socket is formed, a protocol converter having first and second ports for receiving the communication signal encoded according to the first protocol from the signal contact at the first port and transmitting the communication signal converted to a second protocol at the second port and/or for receiving the communication signal encoded according to the second protocol at a second port and transmitting the communication signal converted to the first protocol at the first port, wherein the socket has type detecting means for detecting a characteristic of a plug-in module mounted in the socket, which is uniquely associated to a protocol supported by the plug-in module, and the protocol converter which is connected to the type detecting means and supports a plurality of first protocols is adapted to use at its first port the protocol encoded by the detected characteristic of the plug-in module.

The communication between the plug-in module and the plug-in module frame, more specifically, its protocol converter, may be thus carried out according to any of the protocols supported by the protocol converter, since the latter, owing to the type detecting means, is capable of recognizing the protocol used by said plug-in module and to use it for communication therewith. Thus, the amount of processing in the plug-in module and, hence, its circuit complexity, is reduced substantially. While e.g. in a conventional SFP module a signal processor is needed for converting the format used on the data line connected to the SFP module into the common protocol for communication between the modules and the plug-in module frame, according to the invention a major portion of the processing is transferred from the plug-in module into the frame, where, on the one hand, the conditions concerning space requirements of the circuits are less strict than in the plug-in modules, and, on the other hand, the protocol converter fulfils the tasks of the converter units conventionally provided in the SFP modules.

The protocol converter itself may be formed of a plurality of converter units of the known type which is conventionally used in the plug-in modules and of a switching means for connecting, based on the protocol detected by the type detecting means of a given socket, a plug-in module mounted at that socket to an appropriate converter unit. Thus it is possible to define the sockets independently from the protocol, i.e. at a socket a plug-in module may be placed which supports an arbitrary one of the protocols supported by the protocol converter, and the switching means, based on the protocol detected by the type detecting means, automatically ensures that the concerned plug-in module is connected to a converter unit which supports the concerned protocol.

As type detecting means, mechanical switches might be provided which interact with part of the casing surface of the plug-in module, the shape of which is specific for a protocol used by this particular plug-in module. A preferred solution is that the type detecting means comprise means for addressing and reading a storage component of the plug-in module, in which information about the protocol used by this particular plug-in module are stored.

Further features and advantages of the present invention become apparent from the subsequent description of an embodiment thereof Although this embodiment specifically refers to SFP plug-in modules and a plug-in module frame therefore, it is understood that the invention is applicable in an analogous way to interacting plug-in modules and plug-in module frames according to any other standard.

Figure 1:
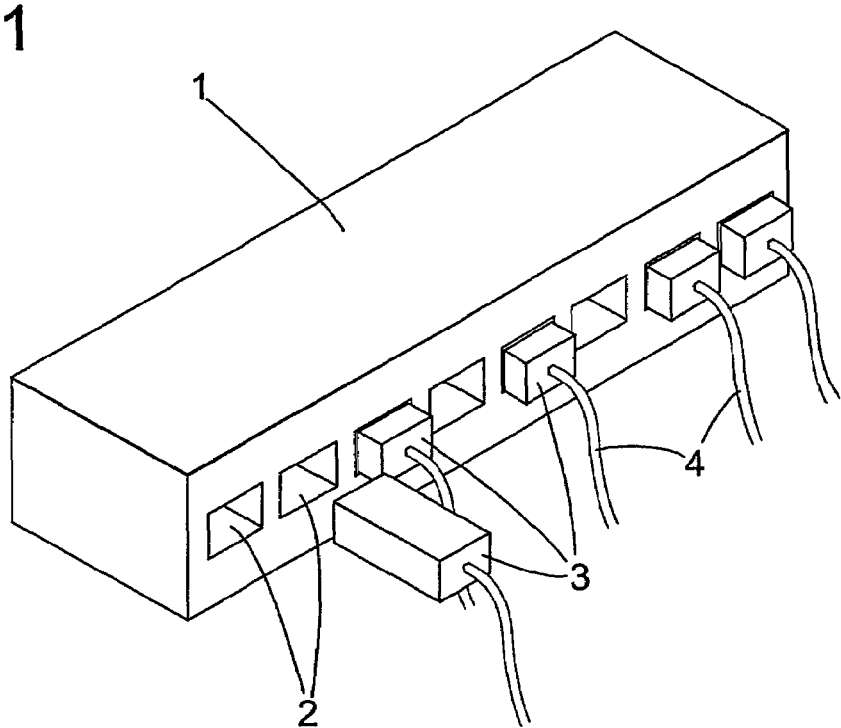
FIG. 1 is a schematic view of a plug-in module frame partially equipped with plug-in modules, according to the invention.

FIG. 1 shows in a schematic perspective view a plug-in module frame 1 having a plurality of sockets 2 which are identical to one another in physical structure, including placement and internal wiring of signal contacts among each other. Each socket is adapted to receive a plug-in module 3 which forms a terminal to a data line 4. The various data lines 4 may be provided for various protocol types, such as Ethernet (10BaseT, FastE, GigE), SDSL, E1 or the like. The data line 4 must not even necessarily be an electrical line, it might also be an optical fibre.

Figure 2:
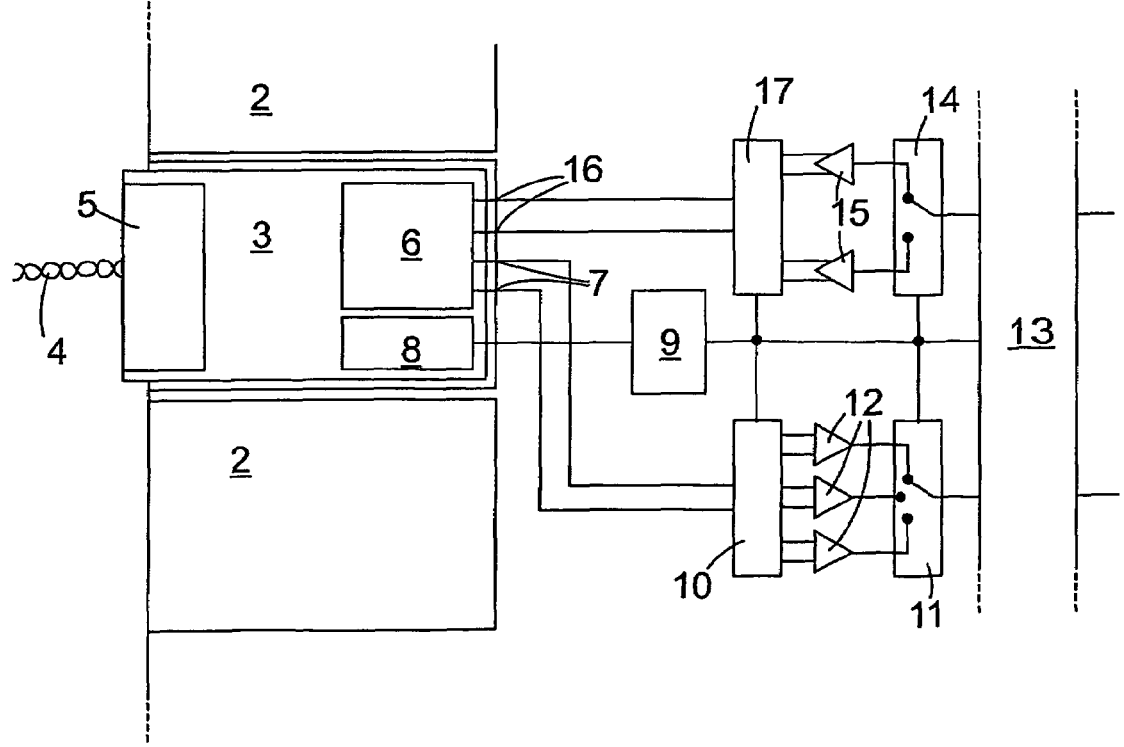
FIG. 2 is a block diagram for illustrating the structure of the plug-in modules and the frame according to a first embodiment of the invention.

As shown in FIG. 2, a plug-in module 3 is removably connected to the data line 4 terminated by it, by a connector 5, which, for the sake of clarity, is not shown in FIG. 1. If the data line 4 is an electrical line, the connector may e.g. be a well-known RJ 45 connector; in case of an optical data line 4 a LC Duplex connector might be considered.

The plug-in modules 3 further comprise, in case of an electrical data line 4, a signal shaping circuit, in particular for adapting the characteristic impedances of the data line 4 and of further processing circuits in the plug-in module frame 1 to one another, or, in case of an optical data line 4, a bi-directional optoelectric converter for converting an optical signal received from data line 4 into an electrical signal for the processing circuits of the plug-in module frame or, respectively, for converting an electrical signal supplied from there into an optical one. Signal shaper and electro-optical converter are referred to by the same reference numeral 6, since in the context of the present invention they have equivalent functions, and, as far as appropriate or unless stated to the contrary, statements about a signal shaper 6 in the subsequent description apply both to an electrical signal shaper in the narrow sense and to the opto-electrical converter.

Two outputs of signal shaper 6 provide a symmetric electrical signal to input signal contacts 7 of the plug-in module frame 1.

In a read-only memory, preferably an EEPROM 8, of plug-in module 3, information is recorded which unambiguously defines the communication protocol used on data line 4 of plug-in module 3. If the plug-in module 3 is mounted at a socket 2, address und data terminals of EEPROM 8 are connected to a microprocessor 9 of plug-in module frame 1 and enable the microprocessor 9 to read from EEPROM 8 and to find out the protocol used on data line 4.

Based on the thus identified protocol the microprocessor controls two receiver-side switches 10, 11. Inputs of switch 10 are connected to input signal contacts 7 of plug-in module frame 1, and the various sets of outputs of switch 10 are each connected to inputs of one of several receiver converter units 12. By means of switch 10 the microprocessor 9 forwards a communication signal received at input signal contacts 7 to the one receiver converter unit 12 which processes the concerned protocol as an input protocol and transforms the received data to a predetermined common receiving protocol. The switch 11 is controlled by microprocessor 9 in analogy to switch 10, so that it connects the output of the active one of the receiver converter units 12 to an input terminal of a transceiver component 13, e.g. of the type LXT9785 manufactured by Intel, which supports this common protocol.

An output terminal of transceiver 13 is adapted to be connected to transmitter converter units 15, inverse to receiver converter units 12, by a switch 14 controlled by microprocessor 9, so as to convert transmission data supplied by transceiver 13 to the protocol used on data line 4. A switch 17, controlled by microprocessor 9, establishes a connection between the output of the active transmitter converter unit 15 and output signal contacts 16, by which the plug-in module 3 receives data for transmission on data line 4.

While the protocol used between the converter units 12, 15 and the transceiver 13 is a common one, in principle arbitrary protocols may be used at signal contacts 7, 16, if the converter units 12, 15 for transmitting and receiving, respectively, according to these protocols are present.

In the embodiment of FIG. 2 the converter units 12, 15 are only adapted to be connected to a single socket 2. Accordingly, converter units for all protocols that are to be supported at a given socket must be held available for all sockets. This is appropriate if the number of protocols to be supported—and, hence, the number of converter units—is not excessive and a very high degree of flexibility concerning the number of plug-in modules that use a same protocol and are to operate at the plug-in module frame 1 is to be achieved. If, in the limit case, each socket 2 has one input converter unit 12 and one output converter unit 15 assigned to it for every protocol that is to be supported, sockets 2 may quite arbitrarily be equipped completely with plug-in modules 3 using a first protocol, completely with plug-in modules 3 using a second protocol or any combination of numbers of plug-in modules 3 using different protocols.

Figure 3:
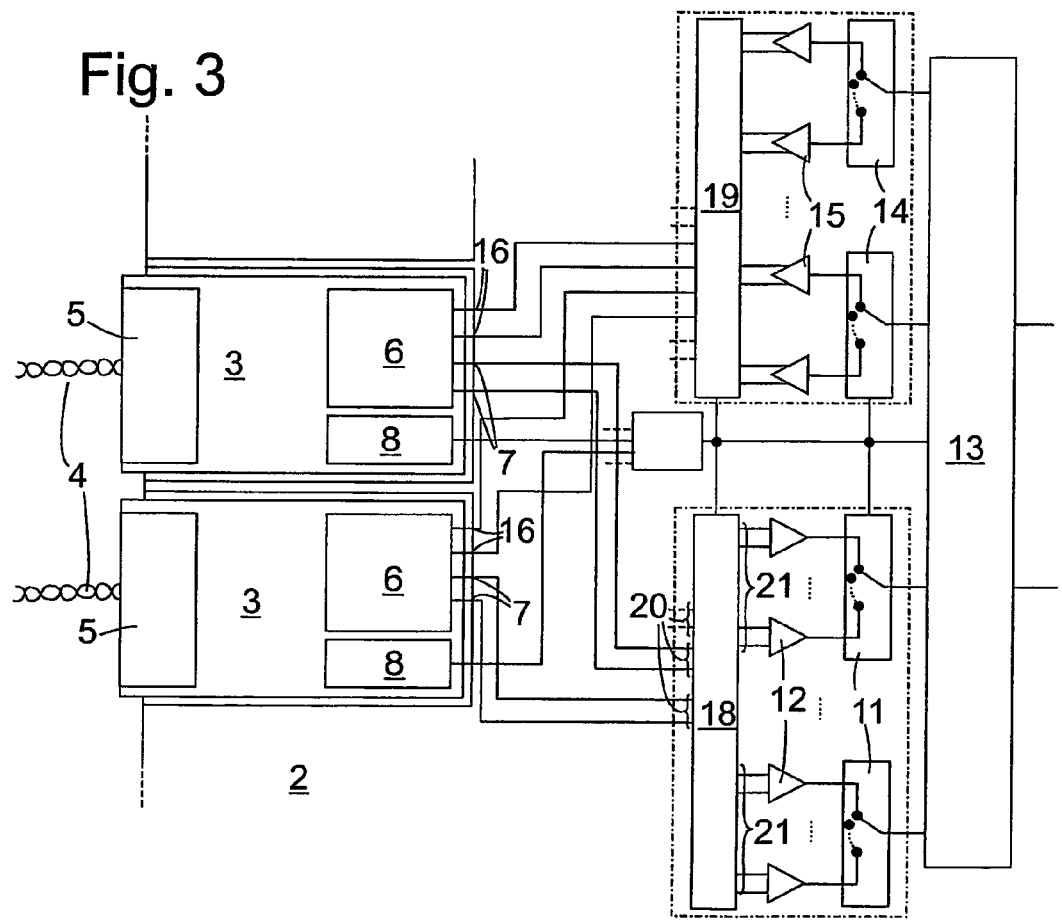
FIG. 3 is a block diagram which illustrates, in a fashion analogous to FIG. 2, a second embodiment.

A smaller number of protocol converter units is needed in the embodiment of FIG. 3. This embodiment is obtained from the one shown in FIG. 2 by replacing the switches 10, 14 specifically connected to a single socket 2 by switching fabrics 18, 19. The receiving switching fabric 18 has an input 20 formed by two symmetric lines corresponding to each socket 2 and has n groups 21 of outputs, each of which is connected to receiving converter units 12, which are connected by a common switch 11 to one of n inputs 22 of transceiver 13. The switching fabric 18 is designed to establish a blocking-free connection between each of its inputs 20 and an arbitrary output from one of the groups 21.

Number and types of the input converter units 12 connected to each group 21 may differ from group to group. In the simplest case, each group 21 has an output with an input converter unit 12 connected to it, wherein from a total of n input converter units 12 m units are designed for a first protocol and the remaining n-m units for a second protocol. In this case the microprocessor 9 detects the protocol used by one of the plug-in modules 3 by reading from its EEPROM 8 and controls the input switching fabric 18 so that it connects the plug-in module 3 to an input converter unit 12 which is appropriate for the concerned protocol. The plug-in module 3 may be mounted at any of sockets 2; the communication signals supplied by it are converted correctly and forwarded to transceiver 13, if the number of plug-in modules 3 using the first protocol is not greater than m and if that of the plug-in modules 3 using the second protocol is not greater than n-m.

A higher degree of flexibility is achieved if at least individual groups have several input converter units 12 for different protocols. If e.g. all groups have a converter unit 12 for the first protocol, and, further, m' groups have a further converter unit 12 for the second protocol, all sockets 2 may be equipped with modules 3 using the first protocol, but any m' of these sockets 2 may alternatively be equipped with a module 3 that uses the second protocol.

It is advantageous and economical to provide in each group 21 a number of outputs corresponding to the maximum supported number of protocols, wherein in an initial build-up stage of the plug-in module frames not all of these outputs have input converter units 12 connected to them. In case of need, the corresponding converter units 12 may be installed at a later time or may be replaced for existing ones, in order to take account of present needs.

The design described above in detail for the receiver side of the plug-in module frame is realized in an in an analogous way at the transmitter side. The transmitter switching fabric 19 has n outputs 22, one for each socket 2, and n groups of inputs 23 that have the transmitter converter units 15 connected to them. The converter units 15, each of which belongs to a group 23 of inputs of transmitter switching fabric 19, are connected by one of switches 14 to a common output of transceiver 13.

The invention claimed is:

1. A plug-in module frame comprising:
   at least one socket having at least one signal contact for communicating information signals between the plug-in module frame and a plug-in module mounted to the socket, the socket comprising type detecting circuitry to detect a characteristic of the plug-in module mounted in the socket, the characteristic being associated with a protocol supported by the plug-in module;
   a protocol converter operatively connected to the type detecting circuitry and having first and second terminals, the protocol converter operable to support a plurality of protocols and configured to:
      receive a first information signal encoded according to a first protocol at the first terminal;
      convert the first information signal from the first protocol to a second protocol based on the detected characteristic; and
      transmit the converted first information signal encoded over the second terminal;
   the protocol converter comprising a plurality of converter units, each converter unit being configured to support a subset of the plurality of protocols; and
   switching circuitry to selectively connect a signal contact of a first socket to a corresponding one of the protocol converter units based on the protocol associated with the characteristic detected by the type detecting circuitry of the first socket.

2. The plug-in module frame of claim 1 wherein the protocol converter is further configured to:
   receive a second information signal encoded according to the second protocol at the second terminal;
   convert the second information signal from the second protocol to the first protocol based on the detected characteristic; and
   transmit the converted second information signal over the first terminal.

3. The plug-in module frame of claim 1 further comprising a plurality of sockets, each socket including a signal contact and type detecting circuitry.

4. The plug-in module frame of claim 1 wherein the type detecting circuitry comprises a circuit to address and read a storage component.

5. The plug-in module frame of claim 1 wherein the socket is configured to receive a Small Form factor Pluggable (SFP) module.

6. A plug-in module configured to be inserted into a plug-in module frame, the plug-in module comprising:
   a type encoding device to interface with a type detecting unit associated with a plug-in module frame comprising:
      at least one socket to receive the plug-in module, and having at least one signal contact for communicating information signals between the plug-in module frame and the plug-in module mounted to the socket, the socket comprising the type detecting unit to detect a characteristic of the plug-in module mounted in the socket, the characteristic being associated with a protocol supported by the plug-in module;
      a protocol converter operatively connected to the type detecting unit and having first and second terminals, the protocol converter operable to support a plurality of protocols and configured to:
         receive a first information signal encoded according to a first protocol at the first terminal;
         convert the first information signal from the first protocol to a second protocol based on the detected characteristic; and
         transmit the converted first information signal encoded over the second terminal;
      the protocol converter comprising a plurality of converter units, each converter unit being configured to support a subset of the plurality of protocols; and
      switching circuitry to selectively connect a signal contact of a first socket to a corresponding one of the protocol converter units based on the protocol associated with the characteristic detected by the type detecting unit of the first socket; and
   the type encoding device being configured to encode an information signal according to the protocol that is supported by the plug-in module.

7. The plug-in module of claim 6 wherein the type encoding device comprises an electronic read-only memory.

8. The plug-in module of claim 6 wherein the plug-in module comprises a Small Form factor Pluggable (SFP)-plug-in module.

* * * * *

UNITED STATES PATENT AND TRADEMARK OFFICE
CERTIFICATE OF CORRECTION

PATENT NO. : 7,555,572 B2  Page 1 of 1
APPLICATION NO. : 10/596204
DATED : June 30, 2009
INVENTOR(S) : Fischer et al.

It is certified that error appears in the above-identified patent and that said Letters Patent is hereby corrected as shown below:

On the Title Page, item (73), under "Assignee", in Column 1, Line 6, delete "Telent GmbH, Backnang (DE)" and insert -- Ericsson AB, Stockholm (SE) --, therefor.

Signed and Sealed this

Twentieth Day of October, 2009

David J. Kappos
*Director of the United States Patent and Trademark Office*